US 6,700,529 B2

(12) United States Patent
Matsuura (10) Patent No.: US 6,700,529 B2
(45) Date of Patent: Mar. 2, 2004

(54) RADAR DEVICE FOR AUTOMOBILE (75) Inventor: Yoshio Matsuura, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/273,388

(22) Filed: Oct. 15, 2002

(65) Prior Publication Data

US 2003/0090408 A1 May 15, 2003

(30) Foreign Application Priority Data

Oct. 16, 2001 (JP) ........................................ 2001-318077

(51) Int. Cl.$^7$ ................................................ G01S 13/93
(52) U.S. Cl. .............................. 342/70; 342/71; 342/72; 342/118; 342/158
(58) Field of Search ........................ 342/70–74, 77–79, 342/81–82, 88, 90, 118, 140–141, 158, 160, 104

(56) References Cited

U.S. PATENT DOCUMENTS

| 5,227,784 A | * | 7/1993 | Masamori et al. | ........... 340/903 |
| 5,793,325 A | * | 8/1998 | Yamada | ........................ 342/70 |
| 5,964,822 A | * | 10/1999 | Alland et al. | ................ 701/301 |
| 6,067,038 A | * | 5/2000 | Uehara et al. | ................. 342/70 |
| 6,119,067 A | * | 9/2000 | Kikuchi | ........................ 701/300 |
| 6,246,357 B1 | * | 6/2001 | Uehara | ......................... 342/70 |
| 6,429,804 B1 | * | 8/2002 | Kishida et al. | ................ 342/70 |

FOREIGN PATENT DOCUMENTS

JP          04204173 A    *  7/1992    ............. G01S/3/44

* cited by examiner

Primary Examiner—Thomas H. Tarcza
Assistant Examiner—Isam Alsomiri
(74) Attorney, Agent, or Firm—Beyer Weaver & Thomas LLP (57) ABSTRACT A radar device set on an automobile includes a transmitter for transmitting forward a beam of electromagnetic waves, a receiver for receiving reflected waves of the transmitted beam from a vehicle traveling in front, a measuring device for measuring a distance to the vehicle in front based on outputs from the receiver and a command outputting device for outputting a specified command signal when the distance measured by the measuring device is decreasing and reaches a threshold distance below which the measuring device becomes incapable of measuring the distance from the outputs from the receiver, and a beam adjusting device for changing either the elevation angle of the beam or its angular range of vision in response to the command signal.

8 Claims, 9 Drawing Sheets

RADAR DEVICE FOR AUTOMOBILE

BACKGROUND OF THE INVENTION

This invention relates to a radar device to be carried on an automobile for measuring on real time the distance to a front-running vehicle.

The radar device carried on an automobile is a kind of so-called pulsed radar device for transmitting a pulsed beam of electromagnetic waves forward and measuring the distance to an object in front inclusive of a vehicle which may be accelerating, decelerating or even stationary (hereinafter referred to as the front-running vehicle) or its relative speed on the basis of the time it takes to receive its reflection. It now goes without saying that ordinary visible light and x-rays are examples of electromagnetic waves.

Figures 10A, 10B:
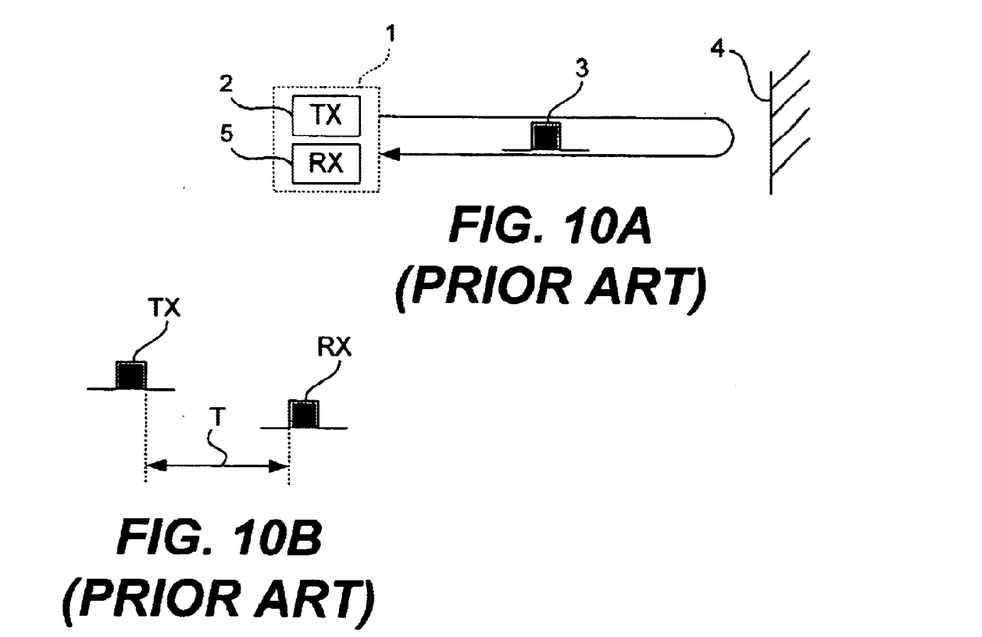
FIGS. 10A and 10B are conceptual diagrams for explaining the principles of a prior art radar device carried on an automobile.

FIG. 10A is a conceptual diagram showing the principle of a prior art radar device 1 carried on an automobile. A pulsed beam 3 of electromagnetic waves transmitted from its signal transmitter (TX) 2 is reflected by a body surface 4 (or any reflective surface such as a back reflector) of a front-running vehicle and received by its signal receiver (RX) 5. If the time between the transmission of the beam and the reception of the reflected beam is T as shown in FIG. 10B, the distance L to the front-running vehicle is given by cT/2 where c is the speed of light. The relative speed between the front-running vehicle and one's own vehicle carrying the radar device 1 can be calculated from the time-rate of change in the distance L between the two vehicles, or as the slope of the curve on the graph of L plotted against the time. If the change in L along the time-axis is zero, for example, this means that the relative speed is zero, or that the front-running vehicle is running at the same speed as one's own vehicle. If L is increasing with time, this means that the front-running vehicle is accelerating with respect to one's own vehicle, and if L is decreasing with time, this means that the front-running vehicle is decelerating with respect to one's own vehicle.

Figure 11A:
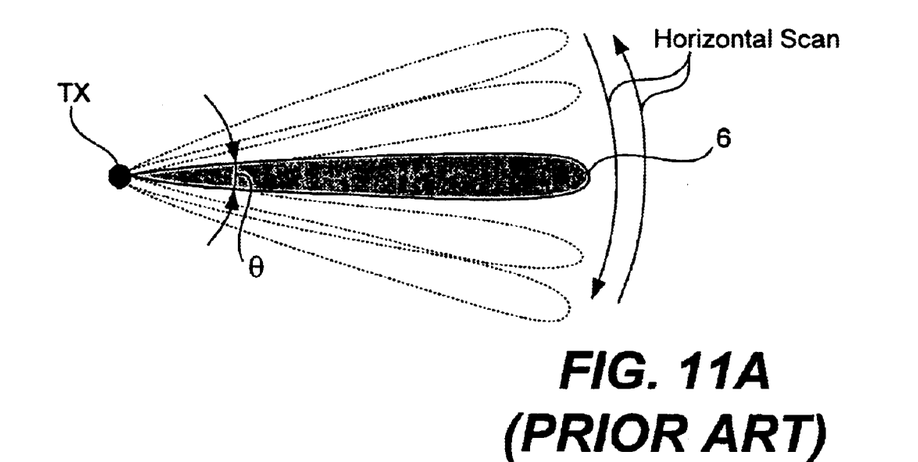
FIGS. 11A, 11B and 11C are respectively a schematic plan view, a side view and a sectional view of a beam of transmitted electromagnetic waves for showing its horizontal pattern, vertical pattern and its sectional shape.
Figure 11B:
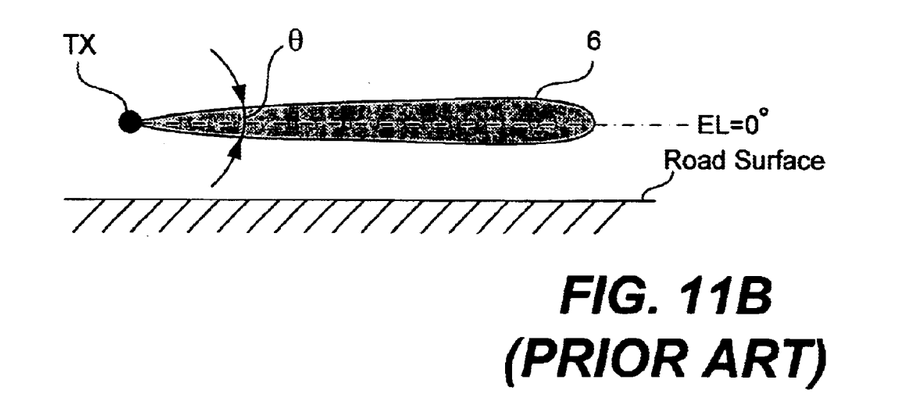
Figure 11C:
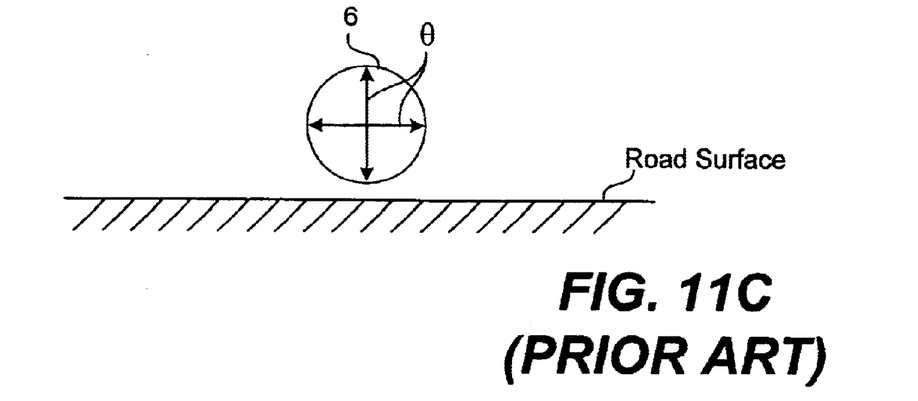

Since the radiative energy of transmitted electromagnetic waves generally decreases inversely proportional to the fourth power of distance, it must be sufficiently large in order to obtain a sufficiently intense reflected beam. Since the capability of the signal transmitter 2 is limited, the beam 3 is generally patterned in a narrowed form, say, with the angle θ of the range of vision equal to about 4°. Such a narrowed pattern is preferred also for the purpose of improving the directional resolution. FIG. 11A shows an example of narrowed beam pattern in the horizontal direction. FIG. 11B is an example of narrowed beam pattern in the vertical direction. FIG. 11C is an example of the cross-sectional shape of such a narrowed beam. Although an example of a narrowed beam with a nearly circular cross-sectional shape is illustrated, the angle θ of the range of vision need not be equal in the horizontal and vertical directions. Such a narrowed beam is generally transmitted at a specified elevation angle (the elevation angle shown in FIG. 11B being zero) while scanning in the horizontal direction within a specified range, as shown in FIG. 11A. The range of the scanning may be determined such that the entire width of an automobile at a sufficiently large distance from one's own vehicle can be covered, that is, about 2.5 m–3 m at 10 m.

Figure 12A:
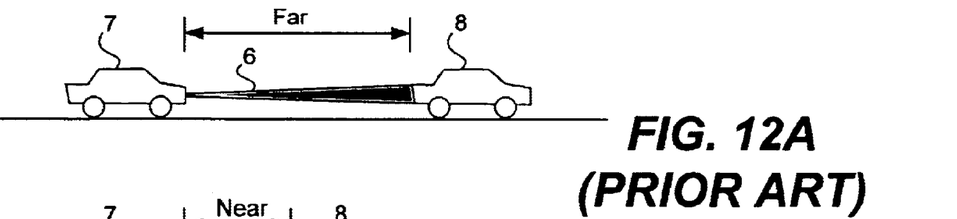
FIGS. 12A and 12B are schematic conceptual side views of a radar beam catching sight of a front-running vehicle.
Figures 12B, 13A, 13B:
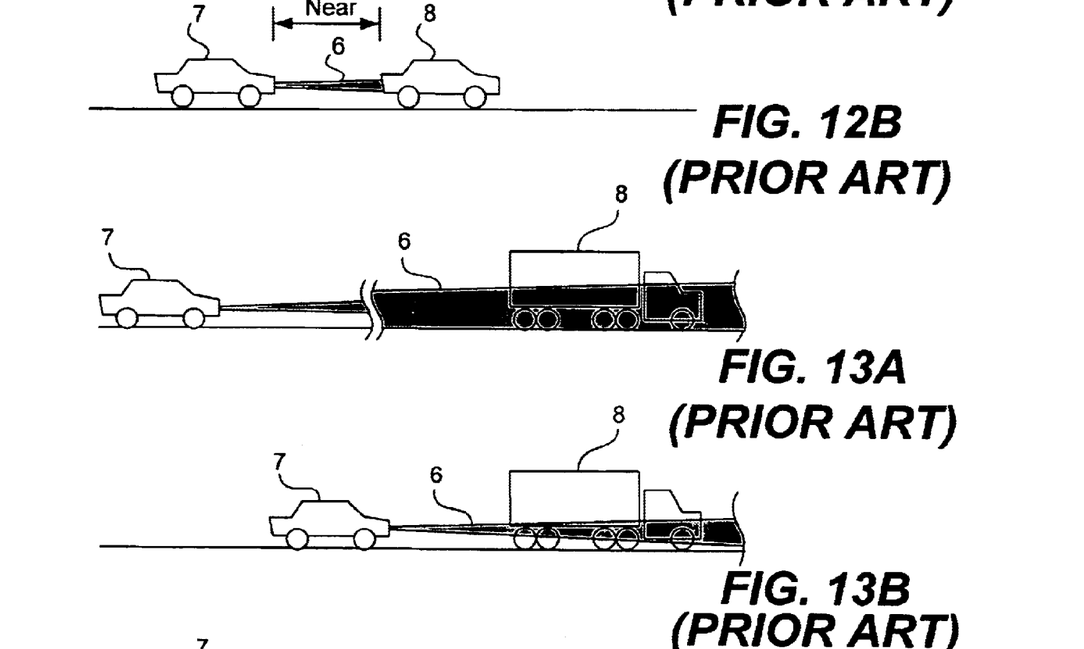
FIGS. 13A and 13B are conceptual diagrams for showing a situation where a prior art radar device loses sight of a front-running vehicle.

With a prior art radar device 1 thus structured, a beam 6 is transmitted from one's own vehicle 7 as shown in FIG. 12A and if its reflection from the front-running vehicle 8 indicates that the distance between the two vehicles 7 and 8 is sufficiently large, one's own vehicle 7 may be accelerated to reduce the distance. If the distance in between is found to be too small to be safe, such as shown in FIG. 12B, one's own vehicle 7 may be braked so as to avoid a collision. In this manner, a so-called stop-and-go system for creeping forward in a traffic jam while maintaining a constant distance from the front-running vehicle may be realized.

With a prior art radar device 1 as described above, a front-running vehicle at a certain distance can be reliably kept visible because a narrowed beam 6 is made use of. There is a problem of suddenly losing sight of the front-running vehicle, however, when the distance between the vehicles is very short. FIGS. 13A and 13B show an example of such a situation where one's own vehicle 7 may be a sports car and is relatively low while the front-running vehicle may be a large freight truck having a back reflector attached at a relatively high position. Since the radar beam 6 is usually transmitted with an elevation angle of about zero degree and a range of vision of about 4°, the front-running vehicle 8 is safely visible as long as it is at a sufficiently large distance, as shown in FIG. 13A. When the distance between the two vehicles 7 and 8 is small as shown in FIG. 13B, however, the beam 6 goes under the body of the front-running vehicle 8 without reaching its reflector at the back.

Figures 14A, 14B:
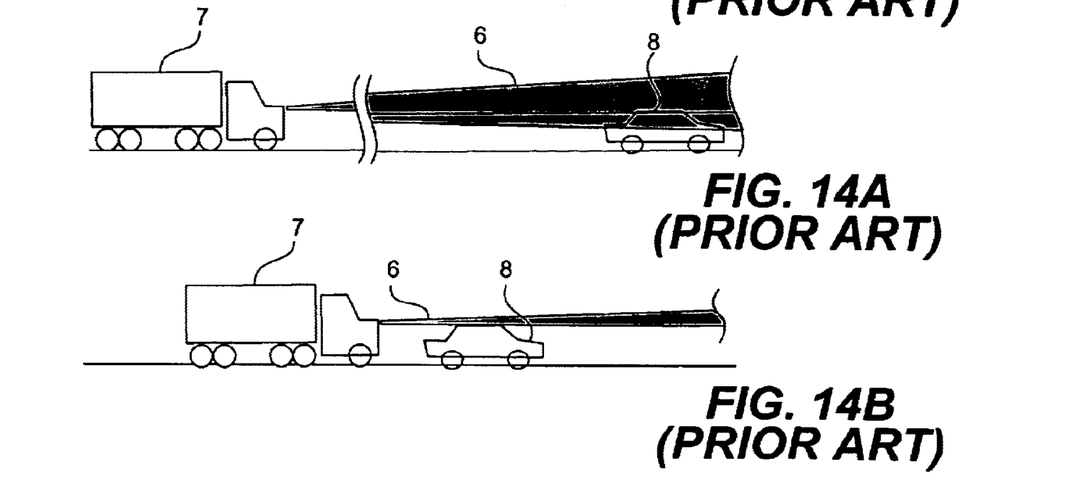
FIGS. 14A and 14B are conceptual diagrams for showing another situation where a prior art radar device loses sight of a front-running vehicle.

FIGS. 14A and 14B show another example of such a situation where one's own vehicle 7 may be a large freight truck while the front-running car 8 may be a sports car and is relatively low. When the distance between the two vehicles 7 and 8 is sufficiently large, the front-running vehicle 8 remains within the spreading range of vision of the beam 6, as shown in FIG. 14A. When the distance between the two vehicles 7 and 8 is small as shown in FIG. 14B, however, the beam 6 may pass above the highest reflective part of the front-running vehicle 8, thereby inconveniently losing sight of it.

These two examples show that necessary data can be reliably obtained as long as the front-running vehicle 8 is sufficiently far away because its presence can be monitored by the radar device 1 on one's own vehicle 7 but the front-running vehicle 8 may be "lost" if the distance between the vehicles 7 and 8 suddenly decreases, say, because the front-running vehicle 8 has suddenly decelerated. From the point of view of safety requirement on such a device, the aforementioned problem is one that must be solved.

SUMMARY OF THE INVENTION

It is therefore an object of this invention to provide an improved radar device to be carried on an automobile with which the problem of suddenly losing sight of the front-running vehicle can be solved.

A radar device embodying this invention, with which the above and other objects can be accomplished, may be characterized not only as comprising a transmitter for transmitting forward a beam of electromagnetic waves having a specified vertical angular range of vision at a specified elevation angle (the "specified initial elevation angle"), a receiver for receiving reflected waves of the transmitted beam from a vehicle traveling in front, and a measuring device for measuring a distance to the vehicle in front based on outputs from the receiver, but also as including a command outputting means for outputting a command signal when the distance measured by the measuring device is decreasing and reaches a certain threshold distance below which the measuring device becomes incapable of measuring the distance based on the outputs from the receiver and a beam adjusting means for changing either the elevation angle or the angular range of vision of the transmitted beam in response to this command signal.

In the above, the threshold distance is the distance at which the reflecting portions such as reflectors at the back of the vehicle in front come to be at a dead angle, not reachable by the beam which is directional, usually having a very small angular range of vision. This can happen most frequently where the difference in height between the transmitter of the beam and the reflector on the vehicle in front is great, and this threshold distance can be calculated from this height difference and the angular range of vision of the transmitted beam.

When the distance to the vehicle in front measured by the measuring device is decreasing and reaches this threshold distance, the radar device concludes that there is a high possibility that the vehicle in front which has been sending back the reflected beam is still in front although the reflected beam may cease to be received and outputs a specified command signal. The means for outputting this command signal is hereinafter referred to as the "command outputting means." In response to this outputted command signal, the radar device causes a change in the emitted beam of radiation either by changing its elevation angle or its angular range of vision such that the reflected waves from the vehicle in front will continue to be received by the receiver and the measuring device will continue to calculate the distance to the vehicle in front. The mechanism for thus modifying the emitted beam is hereinafter referred to as the "beam adjusting means."

If the beam adjusting means is for changing the angular range of vision of the beam to be emitted, the angular range of vision is changed so as to be increased such that the front-running vehicles can continue to reflect back the emitted waves. If the beam adjusting means is of the type for changing the elevation angle of the emitted beam, the elevation angle may be changed either upward or downward. The radar device includes a height setting unit for changing (say, manually) the height of the point of emission of the laser beam. If the emission point is at a higher of the settable positions, the beam adjusting means will function to change the elevation angle downward. If the emission point is at a lower of the settable positions, the beam adjusting means will function to change the elevation angle upward. In this manner, the beam direction can be shifted and the laser beam can go after the front-running vehicle which may have escaped into one of the blind angle regions.

It is preferable to also provide a means (hereinafter referred to as the "return signal outputting means") for outputting a signal (hereinafter referred to as the "return signal") after the command signal is outputted when the distance measured by the measuring means becomes greater than the aforementioned threshold distance (or when the outputs from the receiver increases and change from lower to higher than a threshold level below which the measurement device becomes incapable of measuring the distance therefrom to the front-running vehicle), and a returning means for causing the shifted elevation angle to return back to the specified initial angle or the vertical angular range of vision to return back to the specified angular range in response to the return signal. Thus, the elevation angle or the angular range of vision of the emitted beam of waves is returned to the original state when the distance to the front-running vehicle is restored to a safe range greater than the threshold distance, or when the receiver begins to receive the reflected waves from the front-running vehicle.

It is preferable, furthermore, that the aforementioned command outputting means will function to check whether the front-running vehicle is traveling in the same traffic lane as the automobile on which the radar device is installed and output the command signal only if it is ascertained that they are in the same lane. With such a command outputting means, the radar device can be useful even while the automobile is traveling on a multi-lane highway.

DETAILED DESCRIPTION OF THE INVENTION

The invention is described next by way of an example. It is to be emphasized, however, that this example is intended to be illustrative and not as limiting the scope of the invention. Those of the components having a known structure or functioning in a known manner are not described in detail but this is only for the purpose of simplifying the description and not with the intention of excluding them from the invention.

Figure 1:
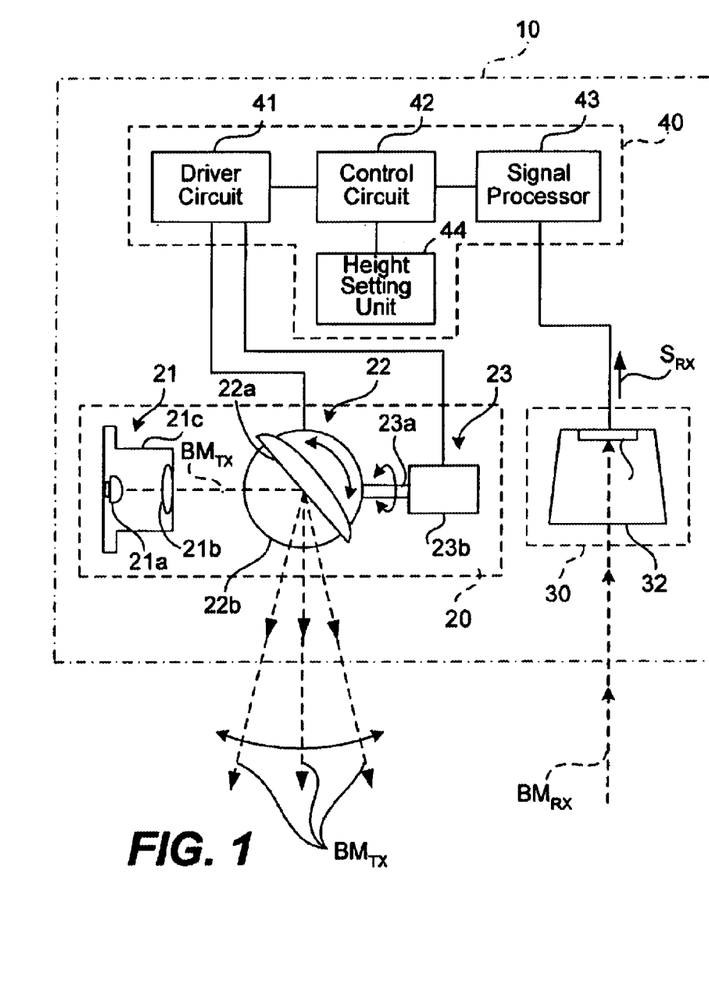
FIG. 1 is a conceptual diagram for showing the structure of a radar device embodying this invention.

FIG. 1 shows conceptually the structure of a radar device 10 embodying this invention which may be adapted to function as an independent device to be carried on an automobile or may be combined with another system such as a traffic jam control system and installed on any automobile or a truck. For the convenience of description, the radar device 10 will be explained below as being adapted to be used with a traffic control system (not shown) such that the distance and/or relative speed between vehicles measured by this radar device 10 are/is adapted to be used by the control system for controlling the speed of one's own vehicle while maintaining a specified distance from the front-running vehicle within an allowed speed limit.

As shown in FIG. 1, the radar device 10 comprises a signal light transmitter 20 for transmitting a laser beam $BM_{TX}$ in a forward direction, a signal light receiver 30 for receiving a reflected laser beam $BM_{RX}$ from a target object (such as a front-running vehicle) in front and a control unit 40 for controlling the operation of the radar device 10 as a whole.

Although FIG. 1 shows the transmitter 20, the receiver 30 and the control unit 40 as separately contained units, this is not intended to limit the scope of the invention. They may all be contained within one common unit, or the transmitter 20 and the receiver 30 may be unitized and placed at a front part of the vehicle such as within its bumper or front grill while the control unit 40 may be placed somewhere else such as inside the engine room.

The transmitter 20 includes a light emitter 21, a horizontal scanner 22 and a vertical scanner 23. The light emitter 21 is provided with a laser diode 21a, an optical system 21b and a case 21c for containing them. The laser diode 21a is, for example, for emitting an infrared laser beam. The optical system 21b is for collecting the laser light outputted from this laser diode 21a (usually with a spread angle of about 30°) and converting it into a laser beam $BM_{TX}$ having a spread angle of about 0.1° in the horizontal direction and about 5° in the vertical direction. The horizontal scanner 22 is comprised of a reflecting mirror 22a for reflecting the laser beam $BM_{TX}$ into the forward direction of the vehicle and a driving mechanism (in horizontal direction) 22b for driving this mirror 22a so as to cause it to undergo a swinging horizontal motion. The vertical scanner 23 is provided with another driving mechanism (in vertical direction) 23b connected to the horizontal driving mechanism 22b through a shaft 23a such that the sloping angle of the reflecting mirror 22a can be varied in the vertical direction by transmitting the swinging motion of this vertical driving mechanism 23b to the horizontal driving mechanism 22b through the shaft 23a and hence that the elevation angle EL of the laser beam $BM_{TX}$ can be freely adjusted.

The optical system 21b need not be formed with a single lens. It may be formed with a lens group with a combination of a plurality of lenses. If the angular spread (or range of vision) of the laser light beam outputted from the laser diode 21a is sufficiently narrow, the optical system 21b may be dispensed with. Although FIG. 1 shows an example with the horizontal scanner 22 disposed behind the optical system 21b, their positions may be interchanged, that is, the optical system 21b may be disposed behind the horizontal scanner 22.

Figure 2A:
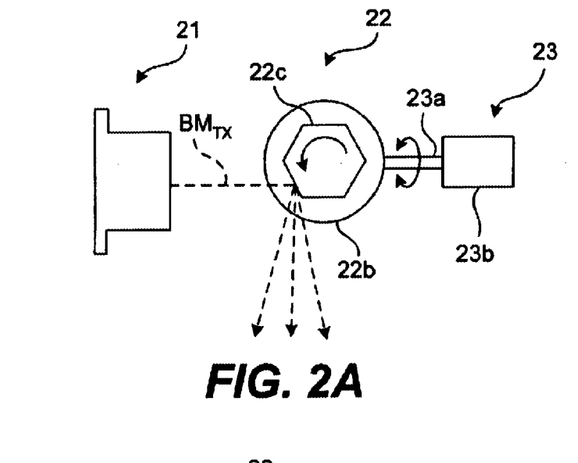
FIG. 2 is a diagram for showing the structure of a horizontal scanner using a polygonal mirror instead of an ordinary reflecting mirror.
Figure 2B:
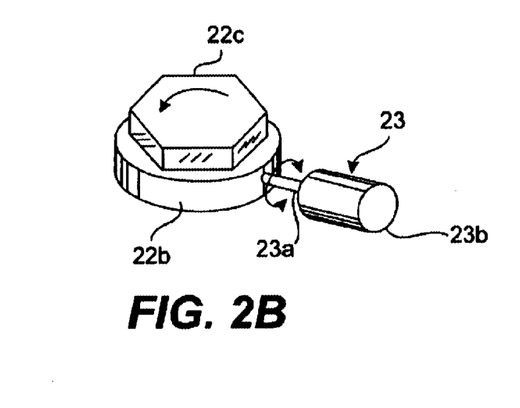

Although the reflecting mirror 22a of the horizontal scanner 22 is shown in FIG. 1 as one which may be produced by using a lustrous material such as aluminum or forming an aluminum membrane over a base material such as a plastic material and mirror-polishing its surface, use as a reflector may be made equally well of a polygonal mirror. FIG. 2 shows another example of the horizontal scanner 22 making use of a polygonal mirror 22c instead of the reflecting mirror 22a shown in FIG. 1. This polygonal mirror 22c has an aluminum membrane formed on each of the six surfaces of a hexagonal columnar body with their surfaces mirror-polished. This polygonal mirror 22c is adapted to be driven also so as to swing both in the horizontal direction by means of the horizontal driving mechanism 22b and in the vertical direction by means of the vertical driving mechanism 23b. For the convenience of description, the horizontal scanner 22 is hereinafter assumed to be structured with a reflecting mirror as shown in FIG. 1.

The horizontal and vertical driving mechanisms 22b and 23b may be formed with a so-called galvano-motor which is an actuator comprised of a rotor of a magnetic material having S and N poles on opposite ends of its axial line and a plurality of excitation coils disposed around this rotor, containing a Hall element inside for detecting the rotary position. It can realize a swing motion with a maximum angular amplitude of about 70° with a superior linear characteristic if the currents for the excitation coils are controlled to feed back the angular position of the rotor.

The receiver 30 is comprised of a light receiving element 31 such as a photoelectric converter serving to receive the reflected laser beam $BM_{RX}$ and to output a light reception signal $S_{RX}$ with a magnitude corresponding to the received quantity of light, an optical system (not shown) for causing the reflected beam $BM_{RX}$ to be efficiently made incident onto this light receiving element and a case 32 for containing them.

Figure 3A:
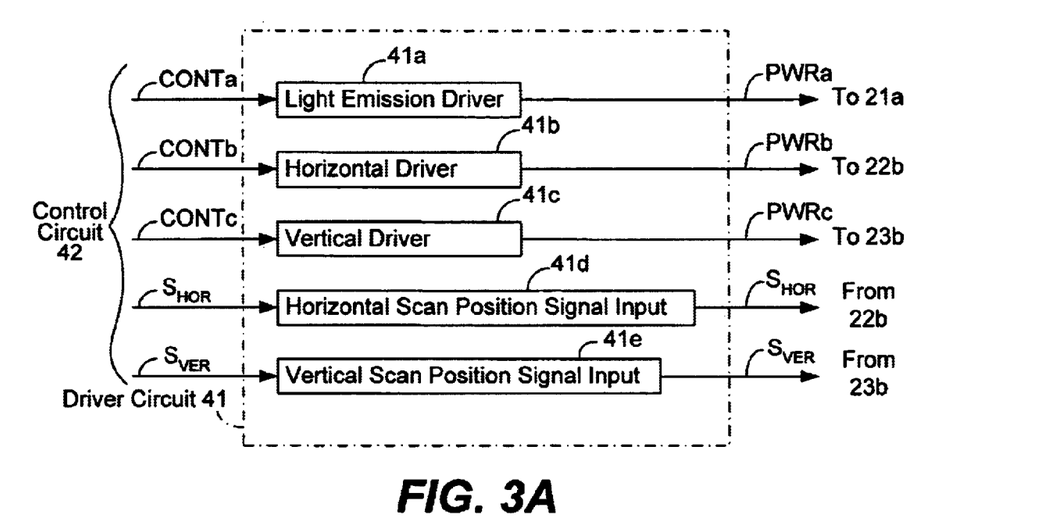
FIG. 3A is a block diagram of the driver circuit and FIG. 3B is a block diagram of the control unit of the radar device of FIG. 1.

The control unit 40 is comprised of a driver circuit 41, a control circuit 42, a signal processor 43 and a height setting unit 44. As shown in FIG. 3A, the driver circuit 41 includes a light emission driver 41a, a horizontal driver 41b, a vertical driver 41c, a horizontal scan position signal input circuit 41d and a vertical scan position signal input circuit 41e. The light emission driver 41a is for causing the laser diode 21a to emit light by supplying power PWRa according to a light emission control signal CONTa from the control circuit 42. The horizontal driver 41b is for driving the horizontal driving mechanism 22b (galvano-motor) by supplying power PWRb according to a horizontal driving control signal CONTb from the control circuit 42. The vertical driver 41c is for driving the vertical driving mechanism 23b (galvano-motor) by supplying power PWRc according to a vertical driving control signal CONTc from the control circuit 42. The horizontal scan position signal input circuit 41d is for carrying out a conversion, if necessary, on a horizontal scan position detection signal $S_{HOR}$ received from the angular position detector (or the aforementioned Hall element) of the horizontal driving mechanism 22b and inputting it into the control unit 42. The vertical scan position signal input circuit 41e is for carrying out a conversion, if necessary, on a vertical scan position detection signal $S_{VER}$ received from the angular position detector (or the aforementioned Hall element) of the vertical driving mechanism 23b and inputting it into the control circuit 42.

Although not illustrated, the signal processor 43 includes an input circuit for removing noise components from the output signal from the light receiving element 31 (or the light reception signal $S_{RX}$), carrying out other necessary signal processing to convert it into a digital signal and inputting it into the control circuit 42. The height setting unit 44 may be comprised of a dip switch with a plurality of bits such that the height of the position for the emission of the laser beam $BM_{TX}$ of the radar device 10 (or the radar height $H_{RDR}$) by manually setting the on-off combination of the bits of this dip switch.

Figure 3B:
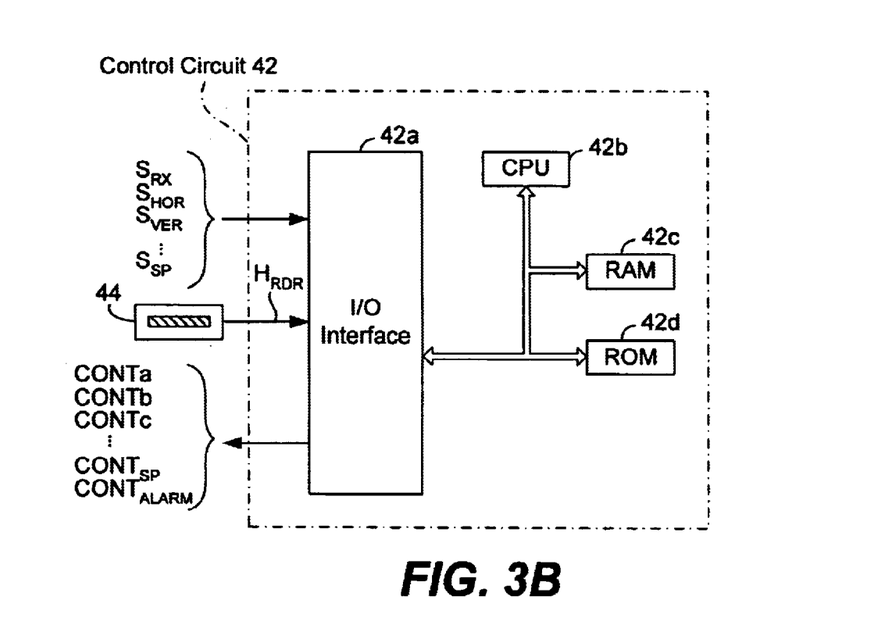

As shown in FIG. 3B, the control circuit 42 is comprised of an input/output (I/O) interface 42a, a microcomputer unit (CPU) 42b, a volatile data memory device (RAM) 42c and a read-only non-volatile data memory device (ROM) 42d.

The radar height $H_{RDR}$ from the height setting unit 44, the light reception signal $S_{RX}$ from the signal processor 43, the horizontal and vertical scan position detection signals $S_{HOR}$ and $S_{VER}$ from the driver circuit 41, as well as a speed signal $S_{SP}$ from a speed sensor (not shown) are inputted to the I/O interface 42a. The light emission control signal CONTa, the horizontal and vertical driving control signals CONTb and CONTc are outputted from the I/O interface 42a to the driver circuit 41. A speed control signal $CONT_{SP}$ and an alarm signal $CONT_{ALARM}$ are also outputted from the I/O interface 42a to a trailing system or an alarm device (not shown).

The CPU 42b serves to load a control program preliminarily stored in the ROM 42d onto the RAM 42c and carry it out so as to take in necessary data such as $H_{RDR}$, $S_{RX}$, $S_{HOR}$, $S_{VER}$ and $S_{SP}$ from the I/O interface 42a while carrying out necessary calculations for the control of the entire operations of the radar device 10, outputting various control data such as CONTa, CONTb, CONTc, $CONT_{SP}$ and $CONT_{ALARM}$ which are obtained by such calculations to the driver circuit 41 and other circuits such as the trailing system and the alarm device through the I/O interface 42a.

The control circuit 42 is an element for carrying out a specified control processing function by an intimate combination of hardware resources such as the CPU 42b and software resources such as the control program stored in the ROM 42d. When a trail command to follow a front-running vehicle is received, the control circuit 42 drives the laser diode 21a to cause the laser beam $BM_{TX}$ to be emitted while the vertical driving mechanism 23b is operated to set the elevation angle EL for the beam $BM_{TX}$ to a specified angle such as 0° such that the laser beam $BM_{TX}$ can reach a sufficiently distant target object over the road surface. Next, the control circuit 42 operates the horizontal driving mechanism 22b to swing the reflecting mirror 22a horizontally and to thereby scan the laser beam $BM_{TX}$ in a horizontal direction. The range of this swinging motion should be such that the entire width of a vehicle sufficiently far from one's own vehicle can be covered such as a width of 2.5 m–3 m at 10 m.

Next, data on the reflected laser beam $BM_{RX}$ received from the receiver 30 such as the presence or absence of reflected waves, the intensity of the reflected waves, the time interval between the transmission and reception of the beam and the directions of the beams (or the scan directions) are sequentially collected. Noise components are removed and a so-called grouping process is carried out to detect the presence or absence of a target object, its kind (or size) and its position and speed data (such as a speed of 70 km/h at 50 m). When the target object in front is an automobile, the reflectors on its back surface are likely to be observed as separate target objects. The grouping process is a process whereby these are treated together as signals associated with a single automobile. If it is determined that there is another vehicle traveling in front of one's own vehicle at a distance less than a specified length and at a speed which is slower than that of one's own vehicle, a control signal may be outputted to the control unit of the engine control system to brake one's own vehicle. If it is determined that there is another vehicle traveling in front at a distance greater than a specified length and at a speed greater than a specified rate or that there is no front-running vehicle at any distance less than a specified length, another signal may be outputted to the control unit to accelerate one's own vehicle within the limit of not exceeding a specified maximum speed, possibly followed by a control to run one's own vehicle at a specified constant speed thereafter.

From the point of view of safety and also for preventing the shortening of the useful lifetime of the device and in particular that of the laser diode 21a, it is preferable to control the device such the trailing control will not be effected when one's vehicle is remaining stationary although a trailing command is then received.

When one's own vehicle is trailing a front-running vehicle as explained above by keeping the front-running vehicle in sight by means of the radar device 10, the aforementioned problem of losing sight of the front-running vehicle may occur if the distance between the two vehicles becomes too short. When such a problem of lost sight takes place, the trailing system may conclude erroneously that there is no front-running vehicle in front and may effect a control whereby the speed of one's own vehicle is dangerously increased. It now goes without saying that such a control should be avoided because the control should be in the direction of increasing safety and one's own vehicle should never be accelerated whenever a front-running vehicle disappears from the sight.

Figure 4:
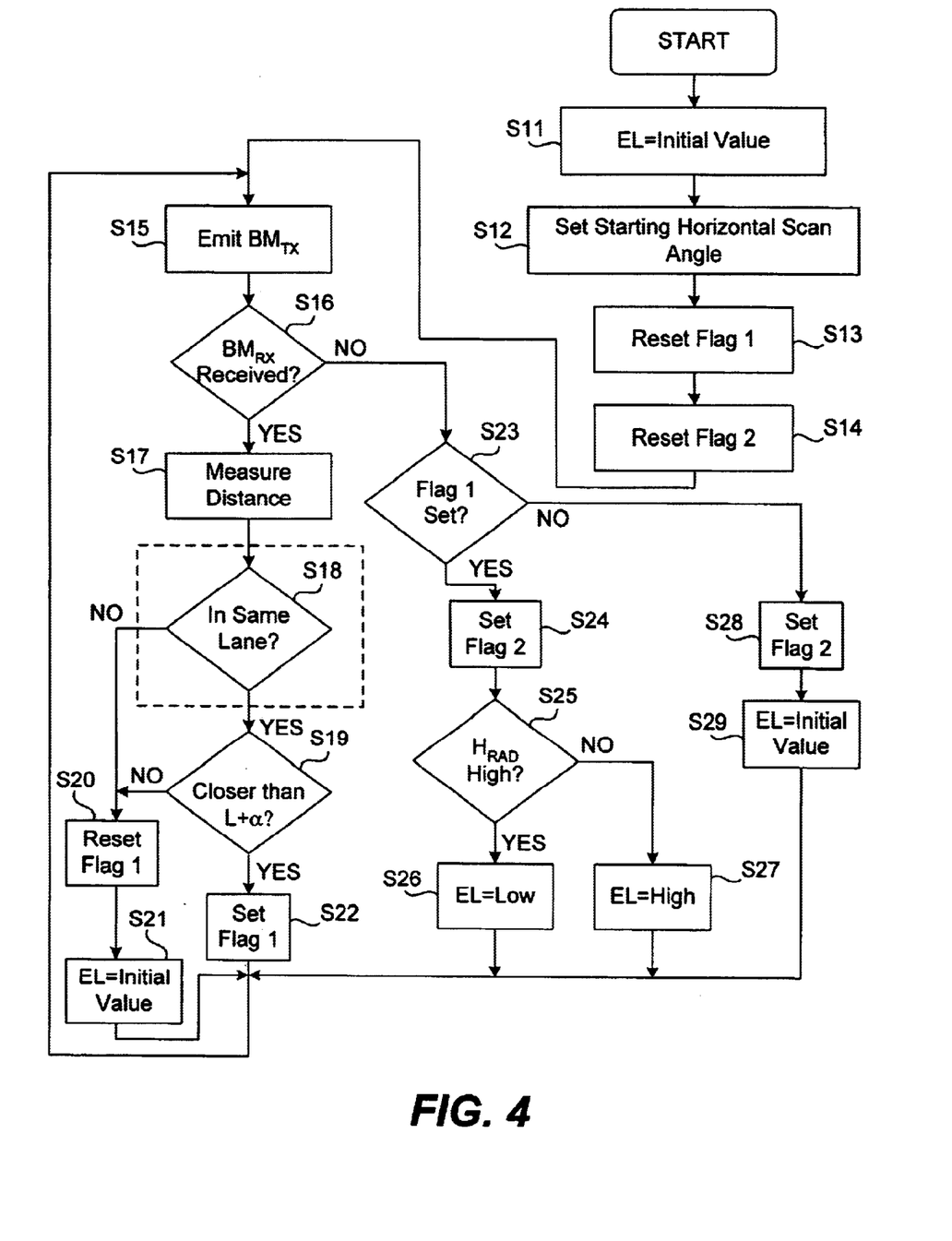
FIG. 4 is a flowchart of a control program which may be carried out by the CPU of the control unit of FIG. 3B.

FIG. 4 shows a flowchart of a control program to be carried out by the CPU 42b of the control circuit 42 according to the present invention in order to properly handle a situation of a disappearing front-running vehicle.

To start, the elevation angle of the laser beam $BM_{TX}$ is set (Step S11), say to 0°, such that the beam $BM_{TX}$ can reach a sufficiently distant object, as explained above. Next, the starting angular position for the horizontal scanning of the laser beam $BM_{TX}$ is set (say, at the center of the scanning range) (Step S12). After two flags (Flag 1 and Flag 2 to be described in detail below) are reset (Steps S13 and S14), the emission of the laser beam $BM_{TX}$ is started (Step S15).

Next, it is determined whether a reflected laser beam $BM_{RX}$ is received from a target object in front such as a front-running vehicle (Step S16). If it is determined that there is a reflected laser beam $BM_{RX}$ (YES in Step S16), the distance to the front-running vehicle and its speed are calculated on the basis of the light reception signal $S_{RX}$ from the signal processor 43 (Step S17) and it is determined whether or not this distance is less than a minimum distance of safety (hereinafter also referred to as the "lost-sight distance"), or such a short distance that may cause the loss of sight of the front-running vehicle because one's own vehicle has approached it too closely (Step S19). If it is determined in Step S16 that the light reception signal $S_{RX}$ is not received from the signal processor 43 (NO in Step S16), this means that the level of the reflected laser beam $BM_{RX}$ or the signal level of the light reception signal $S_{RX}$ from the signal processor 43 has approached, reached or become below a lowest level required for calculating the distance to the front-running vehicle or its speed.

Figure 5A:
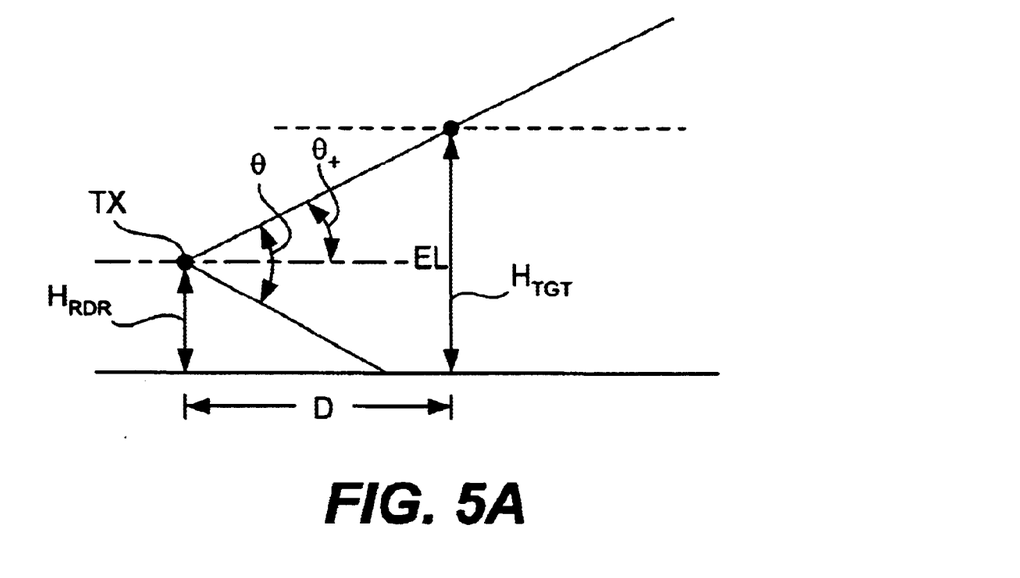
FIGS. 5A and 5B, together referred to as FIG. 5, are diagrams for showing the concept of the lost-sight distance.
Figure 5B:
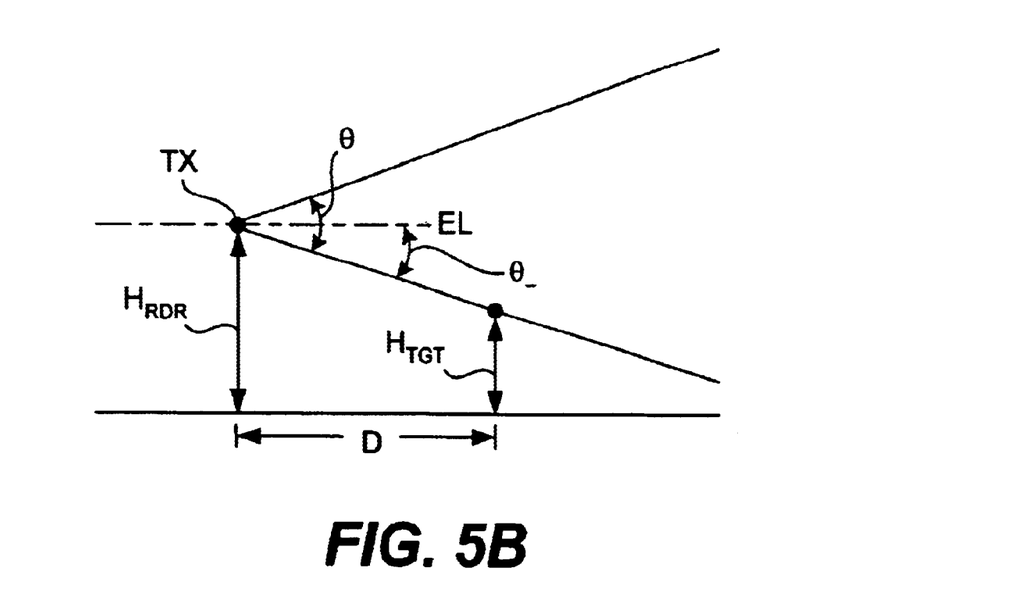

The theoretical lost-sight distance D may be broadly defined as the distance between one's own vehicle and a front-running vehicle at which, as this distance is being shortened, the reflecting part at the back of the front-running vehicle moves out of the range of vision of the laser beam from one's own vehicle. If the radar height is $H_{RDR}$, the vertical angle of spread (or that of the range of vision) of the laser beam $BM_{TX}$ is $\theta$ and the height of the reflector at the back of the front-running vehicle is $H_{TGT}$, as shown in FIGS. 5A and 5B, the theoretical lost-sight distance D is given by Formula (1) shown below if the reflector disappears from the upper edge of the beam as shown in FIG. 5A and by Formula (2) shown below if the reflector disappears from the lower edge of the beam as shown in FIG. 5B:

$$D=(H_{TGT}-H_{RDR})/\tan\theta_+ \quad \text{Formula (1)}$$

$$D=(H_{TGT}-H_{RDR})/\tan\theta_- \quad \text{Formula (2)}$$

where $\theta_+$ and $\theta_-$ are respectively the portion of the angle of spread $\theta$ above and blow the horizontal direction, as shown in FIGS. 5A and 5B. If $H_{RDR}=0.5$ m, $H_{TGT}=1.4$ m and $\theta_+=\theta_-=2°$, as a practical example, Formulas (1) and (2) both give D=25.8 m. According to this invention, a margin $\alpha$ is added to the aforementioned theoretical lost-sight distance D to define a "distance with a possibility of losing sight," taking the change in the orientation of the target object into account.

If it is determined in Step S19 that the distance between the two vehicles calculated in Step S17 is not less than D+$\alpha$ (NO in Step S19), the radar device 10 concludes that the front-running vehicle is safely in sight of the laser beam $BM_{TX}$ and the emission of the laser beam $BM_{TX}$ is continued as before, by returning to Step S15 after resetting Flag 1 (Step S20) and setting the elevation angle equal to the initially set value (Step S21).

As the distance between the two vehicles becomes shorter and it is finally determined that the distance of separation has become less than D+$\alpha$ (YES in Step S119), Flag 1 is set (Step S22) to indicate that there is a possibility for the laser beam $BM_{TX}$ to be losing sight of the front-running vehicle. The laser beam $BM_{TX}$ continues to be emitted in the same manner (Step S15) but when it is thereafter determined that there is no reflected laser beam $BM_{RX}$ (NO in Step S16), it is concluded that the situation is either as shown in FIG. 5A or 5B, not that it was because there is no vehicle in front.

Explained more in detail, it is checked whether Flag 1 is set or reset (Step S23) when the response in Step S16 is NO. Since Flag 1 is in the set condition (YES in Step S23) at this moment, Flag 2 is set (Step S24), the value of radar height $H_{RAD}$ set by the height setting unit 44 is retrieved and it is examined whether the situation is as depicted in FIG. 5A or in FIG. 5B, that is, whether the reflected beam $BM_{RX}$ ceased to be detected because the emitted beam $BM_{TX}$ was too high or too low (Step S25).

If it is determined that the situation was as shown in FIG. 5B, or that the radar height $H_{RAD}$ was too high (YES in Step S25), the elevation angle EL of the laser beam $BM_{TX}$ is lowered (Step S26). If it is determined that the situation was as shown in FIG. 5A, or that the radar height was too low (NO in Step S25), the elevation angle EL of the laser beam $BM_{TX}$ is raised (Step S27). Thereafter, the processes from Step S15 are repeated. According to the program shown by the flowchart of FIG. 4, therefore, the elevation angle of the laser beam $BM_{TX}$ is shifted upward or downward vertically when the reflected laser beam $BM_{RX}$ ceases to be received when the distance between the two vehicles becomes less than the lost-sight distance, or D+$\alpha$.

There are situations where the front-running vehicle may be changing lanes. In this situation, too, the reflected laser beam $BM_{RX}$ may cease to be received by the receiver, but this situation should be distinguished from the aforementioned situation because the front-running vehicle changing its lanes means that there is no longer this obstacle in front of one's own vehicle. Thus, the program shown in FIG. 4 may include the step of determining whether or not the front-running vehicle is traveling in the same traffic lane as one's own vehicle (Step S18). If it is determined that the front-running vehicle is in the same lane as one's own vehicle (YES in Step S18), the program directly proceeds to aforementioned Step S19. If it is determined that the front-running vehicle is not in the same lane (NO in Step S18), Flag 1 is reset (Step S20) and the elevation angle of the laser beam $BM_{TX}$ is set equal to the initial value (Step S21).

The technology for determining whether or not a front-running vehicle is traveling in the same lane with one's own vehicle is well known. This may be done, for example, from the time rate of change in the distance between the two vehicles and the direction of the front-running vehicle with respect to the direction of motion of one's own vehicle. Such a technology may be directly utilized in Step S18. When the road is curving, technologies for detecting its radius of curvature are also known. This may be done, for example, from the steering of one's own vehicle. If these technologies are combined in Step S18, a front-running vehicle apparently moving sideways as it comes to a curving road will not be considered erroneously as moving over to a different lane.

With reference still to the flowchart of FIG. 4, the process for bringing the elevation angle of the laser beam $BM_{TX}$ back to its initially set value will be explained more in detail. When the laser beam $BM_{TX}$ is shifted either upward or downward from the initially set direction, both Flag 1 and Flag 2 are in a set condition. If the distance to the front-running vehicle keeps increasing while the flags remain set and becomes greater than the lost-sight distance D+$\alpha$, the response in Step S119 becomes NO and this causes Flag 1 to be reset (Step S20) and the elevation angle of the laser beam $BM_{TX}$ to be returned to its initial value (Step S21). The processes subsequent to Step S15 are then repeated. During this repetition, since the front-running vehicle is farther in front than by D+$\alpha$, the reflected laser beam $BM_{RX}$ is reliably received and the loop of Steps S15, S16, S17, S18, S19 and S22 is repeated while the front-running vehicle remains in sight. If the front-running vehicle moved to another lane (NO in Step S18), the program goes off this loop.

Figure 6A:
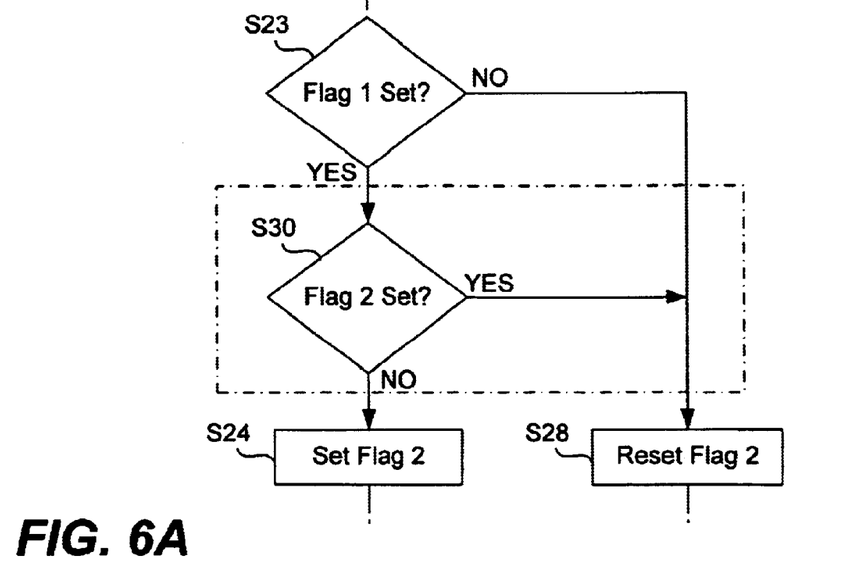
FIGS. 6A and 6B are modified portions of the flowchart of FIG. 4.

A portion of the flowchart of FIG. 4 may be modified as shown in FIG. 6A. According to this modified program, when both Flag 1 and Flag 2 are in a set condition (that is, when the elevation angle has been shifted upward or downward), if the reflected laser beam $BM_{RX}$ cannot be received, it is NO in Step S16 and YES in Step S23 but it is examined thereafter whether Flag 2 is set or reset (Step S30) and, if it is found to be set (YES in Step S30), Flag 2 is reset (Step S28) and the elevation angle of the laser beam $BM_{TM}$ is returned to its original value (Step S29) before repeating the processes after Step S15.

In this repetition cycle, the elevation angle is returned to its initial value and Steps S15 and S16 are carried out. If the reflected laser beam $BM_{RX}$ is received (YES in Step S16), the loop of Steps S17, S18, S19 and S22 is repeated. If the reflected laser beam $BM_{RX}$ is not received (NO in Step S16), Steps S23, S30, S24, S25 and S26 (or S27) can be carried out. Thus, it is possible to wait until the front-running vehicle is recaptured (or the reflected laser beam $BM_{RX}$ is received) while returning the elevation angle to its initial value or shifting it in the upward or downward direction.

Figure 6B:
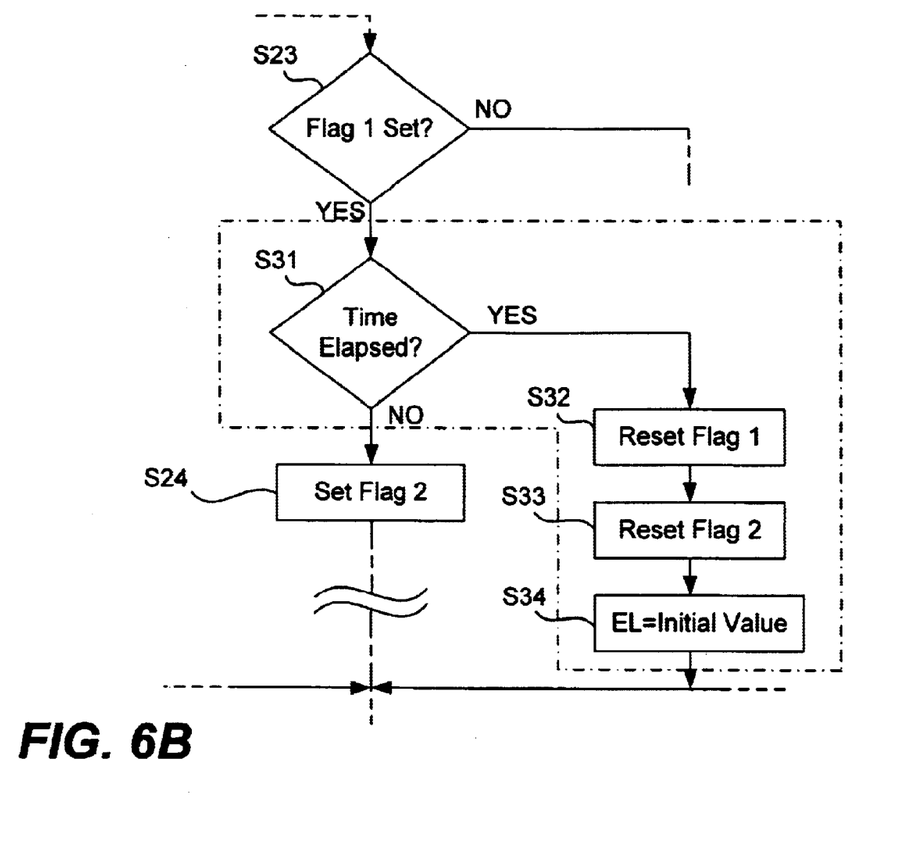

A portion of the flowchart of FIG. 4 may also be modified as shown in FIG. 6B. This modified program assumes a timer which monitors the time elapsed after the elevation angle is shifted. If it is YES in Step S23 of this program, this timer is check to ascertain whether or not a certain preliminarily set time has elapsed since the elevation angle was shifted (Step S31). If the set time has not elapsed yet (NO in Step S31), Flag 2 is set (Step S24) as in the program shown in FIG. 4. If the set time is found to have elapsed (YES in Step S31), Flag 1 and Flag 2 are reset (Steps S32 and S33), the elevation angle is returned to its initial direction (Step S34) and the process for the emission of laser beam $BM_{TX}$ (Step S15) is continued.

With a device thus programmed, after the elevation angle of the laser beam $BM_{TX}$ is shifted upward or downward because the front-running vehicle has disappeared from the range of vision because the distance between the two vehicles has become too short, the elevation angle is immediately and automatically returned to the initial direction if the reflected beam $BM_{RX}$ is not received after the elapse of the set time interval.

Figure 7A:
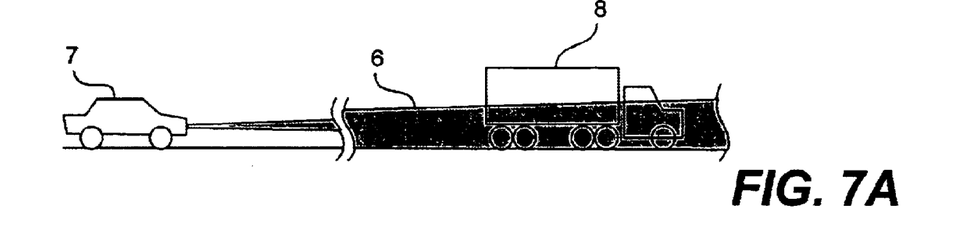
FIGS. 7A, 7B and 7C, together referred to as FIG. 7, are conceptual diagrams showing respectively the laser beam being made incident on a higher front-running vehicle, losing sight of it as the distance of separation becomes too short and having its elevation angle shifted upward.
Figure 7B:
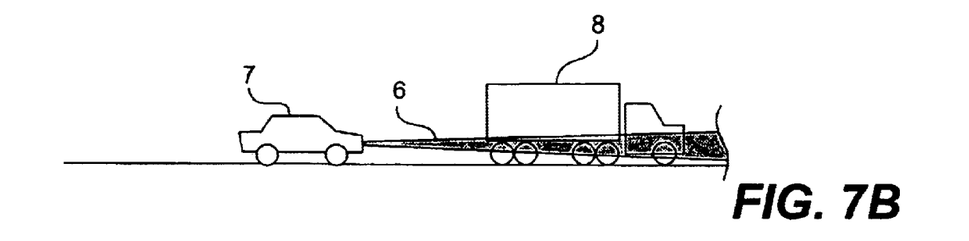
Figure 7C:
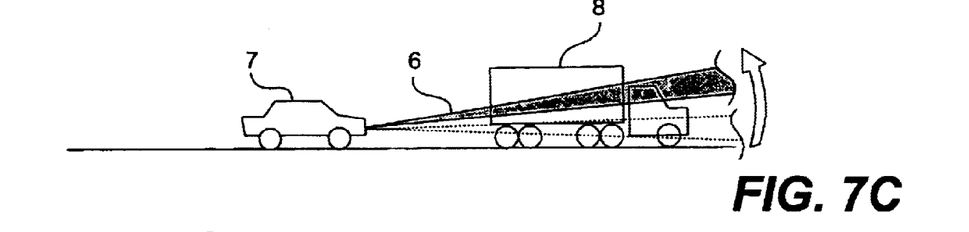
Figure 8A:
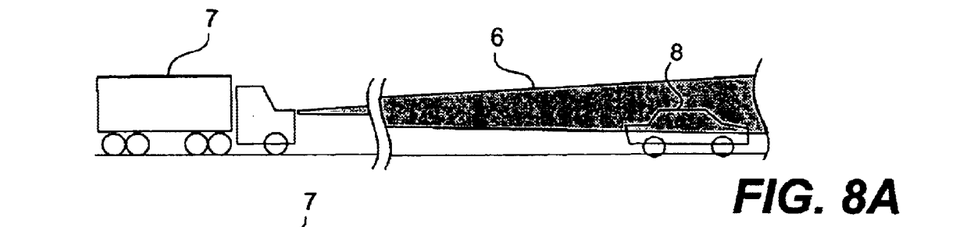
FIGS. 8A, 8B and 8C, together referred to as FIG. 8, are conceptual diagrams showing respectively the laser beam being made incident on a lower front-running vehicle, losing sight of it as the distance of separation becomes too short and having its elevation angle shifted downward.
Figure 8B:
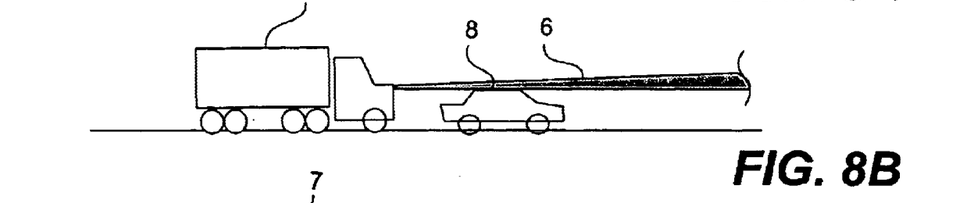
Figure 8C:
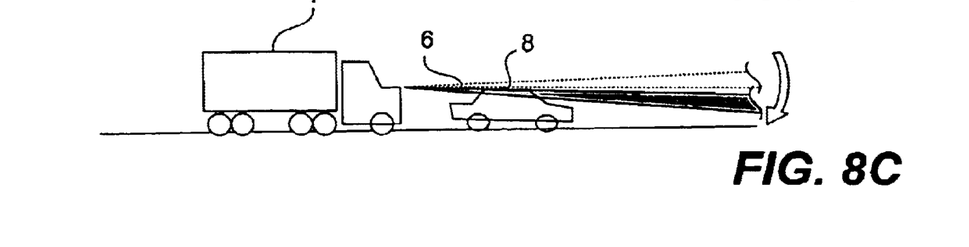

As explained above, the present invention has many advantages, in addition to being capable of overcoming the problem of losing sight of the front-running vehicle when the distance of separation becomes too short. Since it uses Formula (1) or (2) to calculate the lost-sight distance D and concludes that the problem has occurred after ascertaining that the front-running vehicle is in the same traffic lane as one's own vehicle, it can reliably determine whether the absence of the reflected laser beam $BM_{RX}$ is due to the short distance between the two vehicles or because the front-running vehicle has moved to another lane. Since the radar height $H_{RDR}$ can be adjusted by the height setting unit 44 of the control unit 40, the elevation angle can be shifted in a proper direction independent of the type of vehicle on which the radar device 10 is installed. In the case of a smaller vehicle such as a sports car, as shown in FIG. 7, the elevation angle of the laser beam $BM_{TX}$ is shifted upward as the distance to a front-running taller vehicle such as a freight truck becomes shorter than the lost-sight distance such that the problem of blind angles above the laser beam $BM_{TX}$ as depicted in FIG. 5A can be obviated. In the case of a taller vehicle, as shown in FIG. 8, the elevation angle of its laser beam $BM_{TX}$ is shifted downward as the distance to a front-running smaller vehicle becomes shorter than the lost-sight distance such that the problem of blind angles below the laser beam $BM_{TX}$ as depicted in FIG. 5B can be obviated.

Figure 9A:
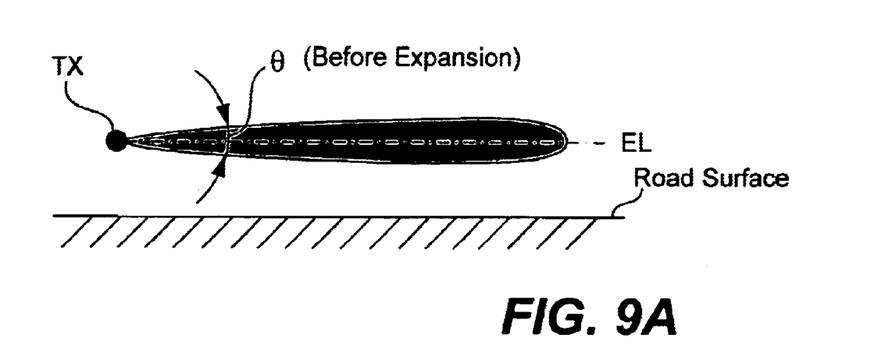
FIGS. 9A and 9B, together referred to as FIG. 9, are conceptual diagrams showing the angular range of vision of the emitted laser beam before and after it is expanded according to this invention.
Figure 9B:
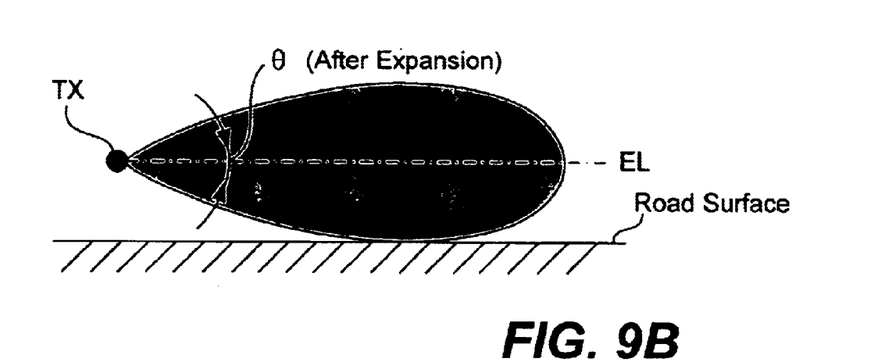

The basic idea of the present invention is not limited to the shifting of the elevation angle of the emitted laser beam $BM_{TX}$. As shown in FIG. 9, the angle θ of the range of vision of (or the angle subtended by) the laser beam $BM_{TX}$ may be adapted to be expanded. FIG. 9A shows the laser beam $BM_{TX}$ under a normal condition when the distance to the front-running vehicle is greater than the lost-sight distance D. Its elevation angle is shown as being 0° and the angle θ is kept at its initial value, say 4°, as shown in FIG. 9A. When the distance of separation between the two vehicles becomes less than the lost-sight distance D, the angle θ is expanded to a specified larger angle, say, about 10°, as shown in FIG. 9B. This embodiment is advantageous in that the regions of dead angles both above and below the laser beam $BM_{TX}$ as shown in FIGS. 5A and 5B can be eliminated simultaneously and hence in that Step 25 in the flowchart of FIG. 4 becomes unnecessary. The angle θ can be made variable by improvising the optical system 21b of FIG. 1 in a manner familiar to a person skilled in the art, for example, by making the focal length of the lens of the optical system 21b variable.

What is claimed is:

1. A radar device on an automobile, said radar device comprising:

a transmitter for transmitting forward a beam of electromagnetic waves having a vertical angular range of vision of a specified range angle with an elevation angle set at a specified initial angle;

a receiver for receiving reflected waves of the transmitted beam from a vehicle traveling in front;

a measuring device for measuring a distance to said vehicle in front based on outputs from said receiver;

a command outputting means for outputting a command signal when the distance measured by said measuring device is decreasing and reaches a threshold distance below which said measuring device becomes incapable of measuring said distance from said outputs from said receiver; and a beam adjusting means for changing said elevation angle in response to said command signal.

2. The radar device of claim 1 further comprising:

a return signal outputting means for outputting a return signal when the distance measured by said measuring means becomes greater than said threshold distance after said command signal is outputted; and a returning means for causing said elevation angle to return back to said specified initial angle in response to said return signal.

3. The radar device of claim 1 further comprising:

a return signal outputting means for outputting a return signal after said command signal is outputted when said outputs from said receiver increases from below to above a threshold level below which said measurement device becomes incapable of measuring said distance therefrom; and a returning means for causing said elevation angle to return back to said specified initial angle in response to said return signal.

4. The radar device of claim 1 wherein said command outputting means outputs said command signal when the distance measured by said measuring device is decreasing and reaches a threshold distance below which said measuring device becomes incapable of measuring said distance from said outputs from said receiver and when said vehicle traveling in front is traveling in the same traffic lane as said automobile on which said radar device is.

5. A radar device carried on an automobile, said radar device comprising:

a transmitter for transmitting forward a beam of electromagnetic waves having a vertical angular range of vision of a specified range angle with an elevation angle set at a specified initial angle;

a receiver for receiving reflected waves of the transmitted beam from a vehicle traveling in front;

a measuring device for measuring a distance to said vehicle in front based on outputs from said receiver;

a command outputting means for outputting a command signal when the distance measured by said measuring device is decreasing and reaches a threshold distance below which said measuring device becomes incapable of measuring said distance from said outputs from said receiver; and a beam adjusting means for changing said vertical angular range of vision in response to said command signal.

6. The radar device of claim 5 further comprising:

a return signal outputting means for outputting a return signal when the distance measured by said measuring means becomes greater than said threshold distance after said command signal is outputted; and a returning means for causing said vertical range of vision to return back to said specified range angle in response to said return signal.

7. The radar device of claim 5 further comprising:

a return signal outputting means for outputting a return signal after said command signal is outputted when said outputs from said receiver increases from below to above a threshold level below which said measurement device becomes incapable of measuring said distance therefrom; and a returning means for causing said vertical range of vision to return back to said specified range angle in response to said return signal.

8. The radar device of claim 5 wherein said command outputting means outputs said command signal when the distance measured by said measuring device is decreasing and reaches a threshold distance below which said measuring device becomes incapable of measuring said distance from said outputs from said receiver and when said vehicle traveling in front is traveling in the same traffic lane as said automobile on which said radar device is.

* * * * *